United States Patent [19]
Tsukamoto et al.

[11] 3,973,830
[45] Aug. 10, 1976

[54] ELECTRO-OPTIC DEVICE

[75] Inventors: Masahide Tsukamoto, Neyagawa; Tetsuro Ohtsuka, Takatsuki; Kazuhisa Morimoto, Settu; Yoshinobu Murakami, Katano, all of Japan

[73] Assignee: Matsushita Electric Industrial Co., Ltd., Japan

[22] Filed: Apr. 23, 1975

[21] Appl. No.: 570,961

[30] Foreign Application Priority Data
June 7, 1974 Japan.............................. 49-65290
June 7, 1974 Japan.............................. 49-65292
June 7, 1974 Japan.............................. 49-65293

[52] U.S. Cl.................... 350/160 LC; 252/299; 252/408
[51] Int. Cl.²................ G02F 1/13; C09K 3/34
[58] Field of Search............... 252/408 LC, 299; 350/160 LC

[56] References Cited
UNITED STATES PATENTS

| | | | |
|---|---|---|---|
| 3,650,603 | 3/1972 | Heilmeier et al. | 252/408 |
| 3,703,331 | 11/1972 | Goldmacher et al. | 252/299 |
| 3,776,615 | 12/1973 | Tsukamoto et al. | 350/160 LC |
| 3,779,751 | 12/1973 | Haas et al. | 252/408 |
| 3,781,088 | 12/1973 | Tsukamoto et al. | 252/408 |
| 3,792,915 | 2/1974 | Oh et al. | 252/408 |
| 3,806,230 | 4/1974 | Haas | 350/160 LC |
| 3,819,531 | 6/1974 | Saeva et al. | 252/299 |
| 3,833,287 | 9/1974 | Taylor et al. | 350/160 LC |
| 3,891,307 | 6/1975 | Tsukamoto et al. | 350/160 LC |

FOREIGN PATENTS OR APPLICATIONS

| | | | |
|---|---|---|---|
| 2,306,738 | 8/1973 | Germany | 252/299 |
| 2,121,085 | 12/1971 | Germany | 252/299 |
| 4,731,883 | 11/1972 | Japan | 252/299 |

OTHER PUBLICATIONS

Gray, G. W. et al., Electronics Letters, vol. 9, No. 26, pp. 616–617 (12/27/73)

Gray, G. W. et al., Liquid Crystals & Plastic Crystals, vol. 1, Ellis Horwood, Ltd., London, pp. 170–171, 142–143 (Jan. 1974).

*Primary Examiner*—Benjamin R. Padgett
*Assistant Examiner*—T. S. Gron
*Attorney, Agent, or Firm*—Wenderoth, Lind & Ponack

[57] ABSTRACT

The present invention provides an improved electro-optical device having a cell for containing a liquid crystal and consisting of two light-transparent plates opposed to each other and having electrically conductive electrodes on the inner surfaces thereof, the electrodes on at least one inner surface being transparent, and spacer means between said opposed electrodes; and a power supply coupled to said electrodes for applying an electric voltage to said electrodes, whereas the improvement comprises a liquid crystal in said cell between said electrodes consisting of 99.95 to 65 wt.% of at least one nematic liquid crystal and 0.05 to 35 wt.% of at least one optically active compound of the formula;

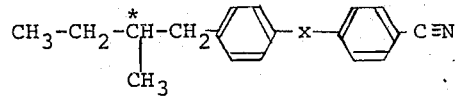

wherein X is CH=N, —N=N—or

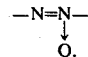

5 Claims, 4 Drawing Figures

ELECTRO-OPTIC DEVICE

This invention relates to an electro-optical device which responds to application of an electric field, and more particularly to an electro-optical device using a cholesteric liquid crystal mixture which consists of at least one nematic liquid crystal or cholesteric liquid crystal and at least one optically active compound with positive dielectric anisotropy and, which has, when incorporated into an electro-optical device, a threshold voltage above which the light transmission of the device changes and responds rapidly to an applied voltage.

Up to the present, many liquid crystal compounds have been developed for use in an electro-optical device, and some of them are on the market. However, these liquid crystals have not been used in matrix display devices because of the disadvantages that they do not have a threshold voltage and have a slow response to an applied voltage. Generally, in a matrix display device, display elements are formed at intersections of a group of strip-shaped electrodes extending in one direction and another group of strip-shaped electrodes extending in the other direction. An image is constructed by applying electric signals to selected electrodes. One example of the structure and the driving method is described in detail, for example, in U.S. Pat. No. 3,776,615.

The matrix display devices have an advantage that the number of lead wires can be less than the number of the display elements. On the other hand, there is a problem of the cross effect which is a phenomena that about half of the applied voltage is undesirably applied to all elements on the selected electrodes except for the element at the intersection of the selected electrodes. This undesired half voltage disturbs the image. For preventing the cross effect, a special liquid crystal is required wherein the light transmission does not change until a certain voltage is applied to the liquid crystal layer between two opposed electrodes. That is, a liquid crystal material is required to have threshold voltage when incorporated into an electro-optical device. Further, for a matrix display device, rapid response of light transmission to an applied voltage is required since an image on the matrix display device is formed by scanning the display elements rapidly.

It has been known that an electro-optical device using a nematic liquid crystal which shows a "dynamic scattering mode" has a threshold voltage. Also, it has been known that an electro-optical device which is known as "twisted nematic device" has a threshold voltage. However, these devices have only a slow response to an applied voltage. It has been known that an electro-optical device using a cholesteric liquid crystal, which is a mixture of cholesterin derivatives and a nematic liquid crystal and has a cholesteric-to-nematic phase transition induced by an electric field has both a threshold voltage and a rather rapid response. However, the response is not rapid enough to be employed in the matrix display device.

Further, it is known that an electro-optical device using a cholesteric liquid crystal, which is a mixture of a nematic liquid crystal having positive dielectric anisotropy and an optically active compound having a molecular structure similar to that of a nematic liquid crystal and has a cholesteric-to-nematic phase transition, also has a rapid response to an applied voltage. The rapidity of the response increases with an increase of the concentration of an optically active compound, that is, with a decrease of the length of the pitch of the helix of the cholesteric phase. However, there is a problem in that when the pitch is shortened by increasing the concentration of the optically active compound in order to obtain a fast response, the threshold voltage becomes too high and it becomes difficult to operate the device by a common transistor circuit. In order to alleviate this problem, there have been developed some optically active compounds having a large positive dielectric anisotropy which decreases the threshold voltage. However, these optically active compounds having large positive dielectric anisotropy have a disadvantage that they do not produce a short pitch when they are mixed with a nematic liquid crystal and so they can not provide a rapid response. Therefore, a material, which has a large positive dielectric anisotropy and makes the pitch short when mixed with a nematic liquid crystal, has been earnestly desired.

An object of the present invention is to provide an improved and novel electro-optical device.

Another object of the invention is to provide an improved electro-optical matrix display device.

A further object of the present invention is to provide an electro-optical device using a cholesteric liquid crystal which has a relatively low threshold voltage and a rapid response to an applied voltage and which provides excellent results when used in matrix display devices.

These objects are attained by employing a cholesteric liquid crystal mixture which consists of 99.9 to 30 wt % of at least one nematic liquid crystal or cholesteric liquid crystal and 0.1 to 70 wt% of at least one optically active compound selected from the group consisting of (+)-p-(2-methylbutyl)benzylidene-p'-cyanoaniline, (+)-p-(2-methylbutyl)-p'-cyanoazobenzene and (+)-p-(2-methylbutyl)-p'-cyanoazoxybenzene. Such an optically active compound has a large positive dielectric anisotropy and produces a short pitch when mixed with nematic liquid crystals.

These and other objects and the features of the present invention will be apparent upon consideration of the following description taken together with the accompanying drawings, wherein.

Optically active compounds used in this invention have the following formula;

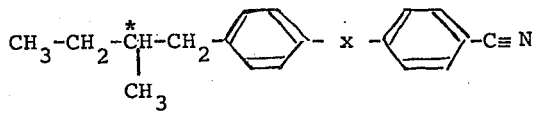

wherein X is —CH=N—, —N=N— or

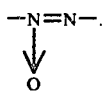

The sign (*) means an asymmetric carbon atom. Only the compound having —CH=N— for X in the above formula exhibits a monotropic cholesteric phase, and the others do not exhibit a mesomorphic phase. These compounds undergo a transition from the solid to the isotropic phase at a transition temperature shown in Table 1.

Table 1

| X | solid ⟶ isotrophic phase |
|---|---|
| —CH=N— | 56 °C |
| —N=N— | 69 °C |
| —N=N—↓O | 70 °C |

These compounds have a large positive dielectric anisotropy and form cholesteric liquid crystals when they are mixed with a nematic liquid crystal or a cholesteric liquid crystal. The mixtures have a relatively low threshold voltage when incorporated into an electro-optical device.

Nematic liquid crystals are classified into two classes. One is nematic liquid crystals the dielectric constant of which in the direction parallel to the long molecular axis is larger than that in the direction perpendicular to the long molecular axis. They are generally called nematic liquid crystals having a positive dielectric anisotropy. A designation "P-nematic liquid crystals" will be used for such nematic liquid crystals having a positive dielectric anisotropy in the following description. The other one is nematic liquid crystals the dielectric constant of which in the direction parallel to the long molecular axis is smaller than that in the direction perpendicular to the long molecular axis. They are generally called nematic liquid crystals having a negative dielectric anisotropy. A designation "n-nematic liquid crystal" is used for such nematic liquid crystals having a negative dielectric anisotropy in the following description.

Figure 1:
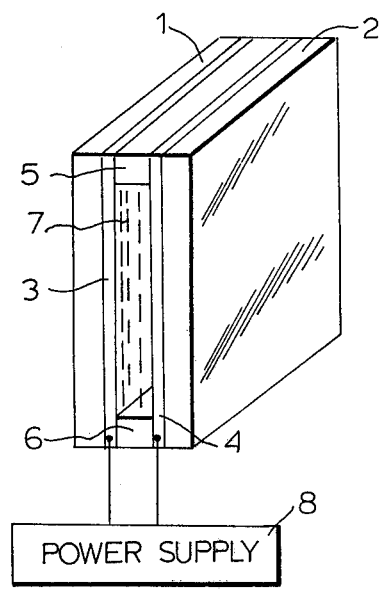
FIG. 1 is a schematic perspective view of a basic structure of an electro-optical device according to the invention.

FIG. 1 shows a basic structure of an electro-optical device of the invention which consists of a cell containing a liquid crystal and a power supply, wherein a liquid crystal layer 7 is sandwiched between two light-transparent plates 1 and 2 which are opposed to each other and having light-transparent and electrically conductive electrodes 3 and 4 on the respective inner surfaces thereof. The thickness of the liquid crystal layer or the distance between the opposed electrodes is determined by spacers 5 and 6. For the light-transparent plate, glass, quartz, plastic or the like is used. The light-transparent electrode is made of $In_2O_3$, $SnO_2$ CuI or the like. The spacer is plastic, glass or the like, and usually it is 5 $\mu$ to 100 $\mu$ in thickness. Power supply 8 supplies an electric voltage between the electrodes 3 and 4. Usually, it contains driver circuits, a signal generator and the like. The transmissive-type electro-optical device can be easily changed to a reflective-type electro-optical device by changing the transparent electrode 3 on the plate 2 to a light-reflective electrode. Further, the electro-optical device as shown in FIG. 1 can be easily modified so as to provide a plurality of display elements by dividing the electrode on the each plate into a plurality of electrodes.

Figure 2:
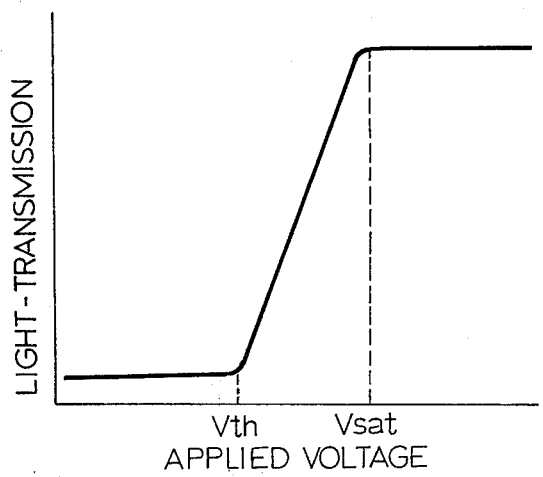
FIG. 2 is a graph showing an electro-optical property of a phase-transition-type cholesteric liquid crystal mixture for explaining the operation of the device of the invention.

The liquid crystal layer 7 of the electro-optical device shown in FIG. 1 contains a mixture of at least one nematic liquid crystal or cholesteric liquid crystal and at least one of the optically active compounds, (+)-p-(2-methylbutyl)benzilidene-p'-cyanoaniline, (+)-p-(2-methylbutyl)-p'-cyanoazobenzene or (+)-p-(2-methylbutyl)-p'-cyanoazoxybenzene, and the mixture has an electro-optical property as shown in FIG. 2. Referring to FIG. 2, light-transmission of the electro-optical device holds at a low level until an applied voltage, either DC or AC, reaches a threshold voltage Vth, and then light transmission increases steeply as the applied voltage exceeds the threshold voltage Vth and further increases. The transmission saturates at a saturation voltage Vsat and remains at a high constant level when the voltage exceeds the saturation voltage. The abrupt change of the transmission is caused by a cholesteric-to-nematic phase transition induced by an electric field. The state during low transmission is cholesteric and the state during high transmission is nematic. This electro-optical property exists whether the applied voltage is DC or AC. The threshold voltage varies with the change of concentration of the optically active compound and increases with an increase of concentration.

In order that the above mentioned mixture exhibit a cholesteric-to-nematic phase transition, the concentration of the optically active compound must be more than a certain limit. The limit of the concentration is determined by the magnitude of the dielectric anisotropy of the nematic liquid crystal or the cholesteric liquid crystal which is mixed with the optically active compound. When the optically active compound is mixed with p-methoxybenzylidene-p'-n-butylaniline the dielectric anisotropy of which is negative and small, the concentration of the optically active compound must be more than 5 wt%. On the other hand, when the optically active compound is mixed with p-hexyloxybenzylidene-p'-cyanoaniline the dielectric anisotropy of which is positive and large, there is no limit for the concentration of the optically active compound. However, it is preferable that the concentration of the optically active compound be higher than 5 wt% in order to obtain a large increase of transmission.

Representative compounds of p-nematic liquid crystals include p-alkoxybenzylidene-p'-cyanoaniline, p-alkylbenzylidene-p'-cyanoaniline, p-cyanobenzylidene-p'-alkoxyaniline, p-cyanobenzylidene-p'-alkylaniline, p-acyloxybenzylidene-p'-cyanoaniline, p-cyanobenzylidene-p'-acyloxyaniline, p-cyanophenyl-p'-alkylbenzoate, p-cyanophenyl-p'-alkoxybenzoate, p-alkylphenyl-p'-cyanobenzoate, p-alkoxyphenyl-p'-cyanobenzoate, p-alkoxybenzylidene-p'-aminobenzene, n-alkyl-p-cyanobenzylidene-p'-aminocinnamate, p-n-alkyl-p'-cyanobiphenyl and p-n-alkoxy-p'-cyanobiphenyl. As a matter of course, mixtures of a plurality of p-nematic liquid crystal compounds as described above are also p-nematic liquid crystal materials and can be employed in the present invention. Further, a mixture of a p-nematic liquid crystal compound and an n-nematic liquid crystal compound which will be described later has the same properties as the p-nematic liquid crystals, and it can be also employed as a p-nematic liquid crystal in the present invention.

In order that the mixture of p-nematic liquid crystal compound and an n-nematic liquid crystal compound be p-nematic i.e., the mixture of a p-nematic liquid crystal compound and an n-nematic liquid crystal compound has larger mean dielectric constant in the direction of alignment of the molecules, i.e., the direction parallel to the long axis of the molecule, than that in the direction perpendicular to the direction of the alignment of the molecules, the concentration of the p-nematic liquid crystal compound must be limited. For example, in the case of a mixture of p-butoxybenzylidene-p'-cyanoaniline (p-nematic) and p-methoxybenzylidene-p'-n-butylaniline (n-nematic), the concentration of p-butoxybenzylidene-p'-cyanoaniline must be more than 5 mole % in order to obtain a nematic liquid crystal having a positive dielectric anisotropy.

Representative compounds of n-nematic liquid crystals include p-alkoxy-p'-alkylazoxybenzene, p-alkyl-p'-alkoxyazoxybenzene, p-alkoxy-p'-alkoxyazoxybenzene, p-alkyl-p'-alkylazoxybenzene, p-alkyl-p'-alkoxyazobenzene, p-alkoxy-p'-alkylazobenzene, p-alkyl-p'-alkylazobenzene, p-alkoxy-p'-alkoxyazobenzene, p-alkoxybenzylidene-p'-acyloxyaniline, p-alkylbenzylidene-p'-acyloxyaniline, p-alkyl-benzylidene-p'-alkoxyaniline, p-alkoxybenzylidene-p'-alkylaniline, and p-alkyl-p'-acyloxyazoxybenzene. A mixture of a plurality of n-nematic liquid crystals has the same properties as the n-nematic liquid crystals, and it can also be employed as an n-nematic liquid crystal in the present invention. Further, a mixture of a p-nematic liquid crystal compound and an n-nematic liquid crystal compound becomes an n-nematic liquid crystal unless the concentration of the p-nematic liquid crystal compound exceeds the limitation described above.

Representative compounds of cholesteric liquid crystals include cholesteryl chloride, cholesteryl bromide, cholesteryl, carboxylic ester such as cholesteryl nonanoate, cholesteryl carbonic esters such as cholesteryl oleyl carbonate and optically active cholesteric compounds such as (+)-p-ethoxybenzylidene-p'-(2-methylbutyl)aniline, and (+)-p-ethoxy-p'-(2-methylbutyl)azoxybenzene.

EXAMPLE 1

A mixture of 30 wt% of p-n-hexylbenzylidene-p'-cyanoaniline(p-nematic) and 70wt% of (+)-p-(2-methylbutyl)benzylidene-p'-cyanoaniline exhibited a cholesteric state. Light-transmission of an electro-optical device with spacer 6 μ thick as shown in FIG. 1 changed abruptly as an applied voltage having a rectangular wave form and a frequency of 250 Hz increased. The threshold voltage was 53 volts at 20°C. The rise time was 2msec when the applied voltage was 75 volts and the decay time was 0.7 msec, where the rise time is the time required for the cholesteric state to change to the nematic state and the decay time is the time for the reverse process.

EXAMPLE 2

A mixture of 50 wt. % of p-n-hexylbenzylidene-p'-cyanoaniline (p-nematic) and 10 wt.% of (+)-p-(2-methylbutyl)-p'-cyanoazobenzene exhibited a cholesteric state. Light-transmission of an electro-optical device with a spacer 6 μ thick as shown in FIG. 1 changed abruptly as an applied voltage having a rectangular waveform and a frequency of 250 Hz increased. The threshold voltage was 22 volts at 20°C. The rise time was 8 msec when the applied voltage was 30 volts and the decay time was 1.3 msec.

EXAMPLE 3

A mixture of 50 wt.% of p-n-hexylbenzyliden-p'-cyanoaniline (p-nematic) and 50 wt.% of (+)-p-(2-methylbutyl)-p'-cyanoazoxybenzene exhibited a cholesteric state. An electro-optical device having the same structure as in the Examples 1 and 2 and containing this mixture showed exhibited an abrupt change in light-transmission as an applied voltage having a rectangular waveform and a frequency of 250 Hz increased. The threshold voltage was 23 volts. The rise time was 10 msec when the applied voltage was 55 volts and the decay time was 2 msec.

EXAMPLE 4

A mixture of 54 wt % of p-methoxy-p'-n-butylazoxybenzene (n-nematic), 23 wt.% of p-methoxy-p'-ethylazoxybenzene (n-nematic) and 23 wt.% of (+)-p-(2-methylbutyl)benzylidene-p'-cyanoaniline exhibited a cholesteric state. An electro-optical device with a spacer 6 μ thick and containing this mixture a the threshold voltage of 20 volts at 20°C when an electric voltage having a rectangular waveform and a frequency of 250 Hz was applied. The rise time was 12 msec when the applied voltage was 40V and the decay time was 5 msec.

EXAMPLE 5

A mixture of 54 wt.% of p-methoxy-p'-n-butylazoxybenzene (n-nematic), 23 wt.% of p-methoxy-p'-ethylazoxybenzene and 23 wt.% of (+)-p-(2-methylbutyl)-p'-cyanoazobenzene had a cholesteric state. An electro-optical device with a spacer 6 μ thick and containing this mixture had a threshold voltage of 24 volts at 20°C when an electric voltage having rectangular waveform and a frequency of 250 Hz was applied. The rise time was 10 msec when the applied voltage was 40 volts and the decay time 7 msec.

Electro-optical characteristics were examined for variations of the concentration of (+)-p-(2-methylbutyl)-p'-cyanoaniline, (+)-p-(2-methylbutyl)-p'-cyanoazobenzene and (+)-p-(2-methylbutyl)-p'-cyanoazoxybenzene.

When the concentration of the optically active compound was increased over 70 wt.%, the threshold voltage became so high that the device tended to break down. Therefore, a concentration of the optically active compound of more than 70 wt.% is undesirable for practical use.

Figure 3:
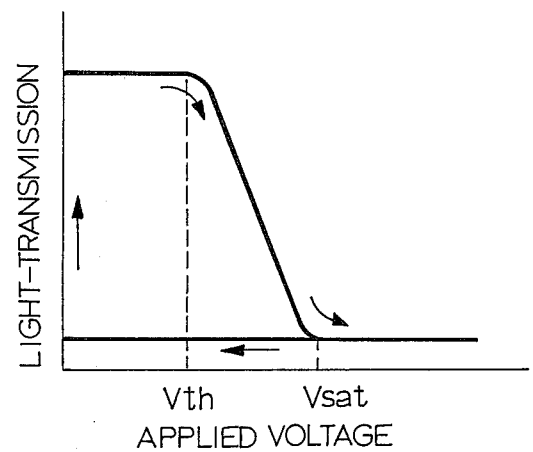
FIG. 3 is a graph showing an electro-optical property of a dynamic-scattering-type cholesteric liquid crystal mixture for explaining the operation of the device of the invention.

When the concentration of the optically active compound was below the limitation and the mixed nematic liquid crystal had a negative dielectric anisotropy, the electro-optical device did not undergo the cholesteric-to-nematic phase transition shown in FIG. 2, but it had a property as shown in FIG. 3, i.e. well-known "dynamic scattering", and it had a memory property as shown in FIG. 3, i.e. well-known "dynamic scattering", and it had a memory property of a low transmission state after removal of the applied voltage.

For example, a mixture of p-methoxybenzylidene-p'-n-butylaniline and (+)-p-(2-methylbutyl)benzylidene-p'-n-buthylaniline and (+)-p-(2-methylbutyl)benzylidene-p'-cyanoaniline exhibits dynamic scattering when the concentration of (+)-p-(2-methylbutyl)benzylidene-p'-cyanoamiline is less than about 5wt%. The change in light-transmission with an increase of applied voltage is steeper than that observed in a pure nematic liquid crystal. This steep change in light-transmission can be observed unless the concentration of (+)-p-(2-methylbutyl)benzylidene-p'-cyanoaniline is less than 0.1 wt.%. The effect can be also observed in a mixture with (+)-p-(2-methylbutyl)azobenzene or (+)-p-(2-methylbutyl)azoxybenzene.

When one of the optically active compounds of the present invention is mixed with a cholesteric liquid crystal such as cholesterin derivatives and other optically active compounds, the mixture undergoes a cholesteric-to-nematic phase transition when a voltage above a threshold voltage is applied, even if the cholesteric liquid crystal itself does not undergo a phase transition. When the cholesteric liquid crystal is one which undergoes a phase transition without the optically active compound of the present invention, the threshold voltage can be reduced by adding the optically active compound of the present invention.

For example, although cholesteryl oleyl-carbonate or (+)-p-ethoxybenzylidene-p'-(2-methylbutyl)aniline, which has a negative dielectric anisotropy, do not undergo phase transition, a mixture thereof with one of the optically active compounds of the present invention undergoes a phase transition so long as the concentration of the optically active compound of the present invention is more than the amount described above, which the mixture has a positive dielectric anisotropy. For another example, although a cholesteric liquid crystal of a mixture of cholesteryl chloride and cholesteryl nonanoate undergoes a phase transition induced by an electric field, the threshold voltage of the mixture is very high and not suitable for a practical use. However, when one of the optically active compounds of the present invention is added to this mixture, the threshold voltage can be reduced to a reasonable value for practical use.

It is apparent from the above description that a mixture of 99.9 to 30 wt.% of at least one nematic liquid crystal or cholesteric liquid crystal and 0.1 to 70 wt. % of at least one optically active compound has excellent properties when used in an electro-optical device. In order to obtain still better properties, non-liquid crystal compounds can be added to the mixture of the present invention in a limited amount as long as the mixture retains its liquid crystal state. For example, by the addition of a small amount of p-n-alkylbenzylidene-p'-n-alkylaniline, the solid-to-liquid crystal transition temperature is lowered and response to an applied voltage is made rapid. Further for adjusting electrical conductivity, a small amount of organic electrolyte can be added. For example, it is well known to control the electrical conductivity of a liquid crystal by adding a small amount a trimethylammoniumhalide, and the addition of such a compound is also effective for the liquid crystals used in the present invention.

Figure 4:
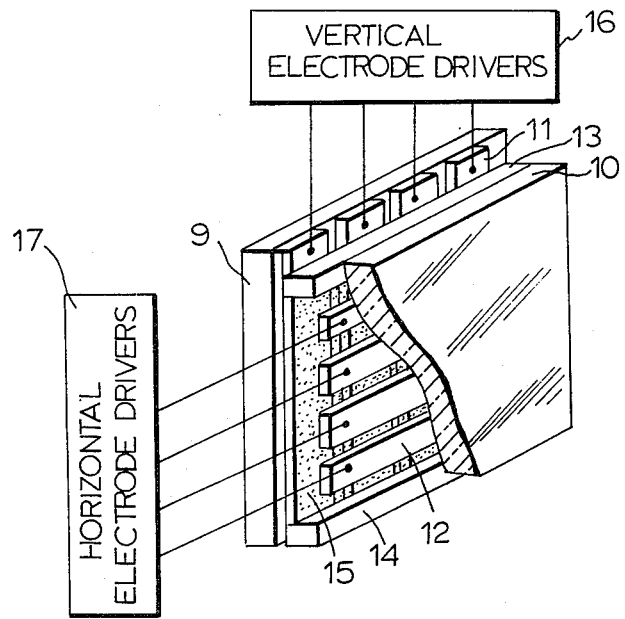
FIG. 4 is a perspective view, partially broken away, of a matrix display device according to the invention.

FIG. 4 is a perspective view, partially broken away of a matrix display employing the present invention, wherein the liquid crystal layer 15 is a mixture of at least one nematic liquid crystal or cholesteric crystal and at least one optically active compound as described above, and layer 15 is sandwiched between two light transparent plates 9 and 10 having light-transparent strip-shaped electrodes 11 and 12 on the inner surfaces thereof. The direction of the strip-shaped electrodes on one plate 9 is perpendicular to that of the strip-shaped electrodes on the other plate 10. Spacers 13 and 14 determine the thickness of the liquid crystal layer 15.

For displaying images, the vertical strip-shaped electrodes 11 on the plate 9 and the horizontal strip-shaped electrodes 12 on the plate 10 are excited by voltage signals produced by vertical electrode drivers 16 and horizontal electrode drivers 17. Various methods for application of voltage signals for displaying images are well known to those skilled in the art. Since a display element at an intersection of a vertical electrode and a horizontal electrode in the matrix display device of the present invention undergoes an abrupt change of light-transmission above a threshold voltage and rapid response to an applied voltage, as described hereinbefore, no cross effect, which blurs images, is produced and fast scanning can be employed so as to produce flicker-free images.

The shape of the vertical and horizontal electrodes in FIG. 4 can be changed to other shapes for changing the square shape of the display elements to other shapes. For example, the shape of the vertical and horizontal electrodes can be changed in such a manner that the intersections of the vertical and horizontal electrodes form well-known 7-segment numerals.

The transmissive type matrix display device as shown in FIG. 4 can be easily modified to a reflective type matrix display device by changing the transparent electrodes 11 on the plate 9 to light-reflective electrodes.

As described hereinbefore, the present invention provides a novel electro-optical device having a relatively low threshold voltage and rapid response. Further, the matrix display device of the present invention has a good performance.

Although the invention has been described in detail with respect to various preferred embodiments, it is not restricted to them. Modification and variation are possible which are within the spirit of the invention and the scope of the claims.

What we claim is:

1. In an electro-optical matrix display device having a cell containing a liquid crystal composition exhibiting a cholesteric to nematic phase transition upon applied voltage, which cell comprises two light-transparent opposed plates having a plurality of strip-shaped electrodes on the inner surfaces thereof, the direction of the strip electrodes on one of said plates intersecting that of the strip electrodes on the other said plate so as to provide a plurality of display elements at the intersections, the strip electrodes on at least one of said inner surfaces being transparent, and a spacer between said opposed electrodes; and a power supply coupled to said electrodes for applying an electric voltage to said electrodes, the improvement wherein the liquid crystal composition in said cell between said electrodes comprising 99.9 to 30 wt.% of at least one liquid crystal selected from the group consisting of nematic liquid crystals and cholesteric liquid crystals, and 0.1 to 70 wt.% of at least one optically active compound of the formula:

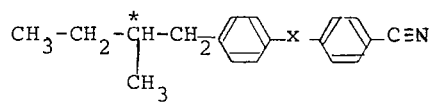

wherein X is CH=N, —N=N— or

2. An electro-optical device as claimed in claim 1, wherein said liquid crystal has a positive dielectric anisotropy.

3. An electro-optical device as claimed in claim 1, wherein said liquid crystal has a negative dielectric anisotropy.

4. An electro-optical device as claimed in claim 1, wherein said strip-shaped electrodes on one of said plates are light-reflective.

5. An electro-optical device as claimed in claim 1, wherein said plurality of said display elements form 7-segment numerals.

* * * * *